US008171057B2

(12) United States Patent
Short et al.

(10) Patent No.: US 8,171,057 B2
(45) Date of Patent: May 1, 2012

(54) MODELING PARTY IDENTITIES IN COMPUTER STORAGE SYSTEMS

(75) Inventors: Keith W. Short, Redmond, WA (US); Kim Cameron, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 12/410,680

(22) Filed: Mar. 25, 2009

(65) Prior Publication Data
US 2010/0114984 A1    May 6, 2010

Related U.S. Application Data

(60) Provisional application No. 61/107,953, filed on Oct. 23, 2008.

(51) Int. Cl.
G06F 17/30 (2006.01)
(52) U.S. Cl. ........................................ 707/802
(58) Field of Classification Search .................. 707/802
See application file for complete search history.

(56) References Cited

U.S. PATENT DOCUMENTS

| | | | |
|---|---|---|---|
| 6,026,382 A | 2/2000 | Kalthoff | |
| 7,146,560 B2 | 12/2006 | Dang et al. | |
| 2003/0163733 A1* | 8/2003 | Barriga-Caceres et al. | 713/201 |
| 2006/0080352 A1* | 4/2006 | Boubez et al. | 707/102 |
| 2006/0129817 A1* | 6/2006 | Borneman et al. | 713/170 |
| 2006/0155993 A1* | 7/2006 | Busboon | 713/169 |
| 2006/0277595 A1* | 12/2006 | Kinser et al. | 726/3 |
| 2007/0199056 A1 | 8/2007 | Bhatia et al. | |
| 2008/0127320 A1* | 5/2008 | De Lutiis et al. | 726/9 |
| 2008/0168539 A1 | 7/2008 | Stein | |
| 2008/0178271 A1* | 7/2008 | Gajjala et al. | 726/6 |
| 2008/0222096 A1 | 9/2008 | Ungureanasu et al. | |

OTHER PUBLICATIONS

Cameron et al., Design Rationale behind the Identity Metasystem Architecture, Jan. 2006.*
Ramamurthy, B., "Entity-Relationship Model", Chapter 2, Oct. 2008, 30 pages.
Baldwin, Adrian, et al., "On Identity Assurance in the Presence of Federated Identity Management Systems", Trusted Systems Laboratory, HP Laboratories Bristol, Mar. 28, 2007, 17 pages.
Microsoft Corporation, "Microsoft's Vision for an Identity Metasystem", May 2005, 10 pages.

* cited by examiner

Primary Examiner — Hung Q Pham
Assistant Examiner — William Spieler
(74) Attorney, Agent, or Firm — Workman Nydegger

(57) ABSTRACT

The present invention extends to methods, systems, and computer program products for modeling party identities in computer storage systems. A federated identity fabric models identity data and relationships between portions of indentify data in computer storage systems in accordance with a uniform schema. The federated identity fabric can federate distributed identity and identity relationship data from computer storage systems within the variety of different computing environments. Code and metadata at computing environments associated with the federated identity fabric can interoperate to facilitate uniformly storing, accessing, modifying, deleting, and securing identity and identity relationship data within the federated identify fabric. Embodiments of the invention include utilizing an identity key table entry to locate party identity information and performing key transformations between different types of identity keys.

17 Claims, 9 Drawing Sheets

MODELING PARTY IDENTITIES IN COMPUTER STORAGE SYSTEMS

CROSS-REFERENCE TO RELATED APPLICATIONS

This application claims the benefit of U.S. Provisional Application No. 61/107,953, entitled "Modeling Party Identities in Computer Storage Systems", filed on Oct. 23, 2008, which is incorporated herein in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Stored data can be stored in multiple different scales and at multiple different sites. For example, computer systems in both public networks (for example the internet based worldwide web) and private networks (for example, a particular company's internal local area network), increasingly have access to information on individuals, companies and other organizations, both governmental and private. This information may be held in a single location on those networks or in multiple locations. Further, many software systems increasingly share or federate information between networked computers and their human users. Sharing enough information across varied contexts, devices, and scales to provide consistent access to useful data, while at the same time preventing accidental or malicious exposure to private information, is of concern to individuals and organizations alike.

Technology exists for checking the authenticity of individuals and organizations using various mechanisms, and for encoding or encrypting information prior to transfer and in various computer-based stores. However, these technologies rely on ways that a stored representation of an individual or organization may be associated with a sequence of characters that is known to uniquely identify the individual or organization for some purpose. Example of such strings of characters include the world-wide web domain name of a company (such as www.microsoft.com), and an email address issued by hotmail.com for an individual (e.g. JohnDoe@hotmail.com). Such sequences of characters are known as unambiguous identifiers, where multiple unambiguous identifiers may identify a single entity. However, conventionally these unambiguous identifiers are modeled no differently than non-identifying properties of a given entity (for example, the email address of an employee will conventionally be a property in an employee record or a tuple in a table of email addresses).

No matter what data structures are chosen, representing an unambiguous identifier as a property within any one data structure may prove inadequate due to the fact that unambiguous identifiers of a single kind must be used to identify entities in different data structures. If the unambiguous identifier is represented as a property in multiple data structures, then it may be impossible, a priori, to know what data structure might contain a given unambiguous identifier, rendering the system difficult, expensive or impracticable to use as a lookup mechanism at large scale.

A number of problems arise when deciding on a way to store unambiguous identifiers in a computer-based store. For example, it is often difficult to determine an appropriate manner to represent organizations and individuals. This can include determining what data structures should be used in a computer-based store.

Further, each unambiguous identifier must typically be associated with an issuing authority. However, an individual or organization may have multiple unambiguous identifiers each of which is used within a different context. As such no single unambiguous identifier may serve as a data store unique identifier. For example, if Jane Smith has an email issued by hotmail.com as JaneSmith@hotmail.com and JaneSmith@gmail.com from www.gmail.com, neither identifier, though unambiguous, may be the unique identifier in a computer system for Jane, the individual.

Additionally, each unambiguous identifier may be associated with a specific set of permissions that specify what information may be obtained via that unambiguous identifier and how it may be used. For example, Jane may wish to separate aspects of her identity pertinent to her current employer from aspects of her identity related to social contexts embodied at www.Facebook.com or at www.hotmail.com. She may have agreed to grant full access permission to resources and events she created using her employee identity, but restrict access to her photographs at spaces.msn.com to her named friends, and keep all her mail at www.hotmail.com private.

Moreover, relationships between individuals, between organizations, and between organizations and individuals may influence how identity information is shared and used. However, representing relationships between these entities in a computer store—or a set of computer stores existing at different scales and in different contexts—can be difficult due at least in part to a variety of different data formats that can be used to store such relationships. Relationships can also be difficult to represent due to the multiple unambiguous identifiers that may be employed to identify the members of such relationships.

Some identity information is contextualized by location. Locations can include conventional location information such as mailing addresses, as well as geographical presence, such as dynamic or static latitude and longitude coordinates. Similar to relationships, it can be difficult represent such contextual information due at least in part to a variety of different data formats that can be used to store contextual information.

Further, identity data is typically separated from applications that used the identity data. For example, identity can be maintained in different computer stores in and at different scales tailored to specified application contexts. Thus, identity data is also typically stored separately from application data used by the application. For example, X.500 can silo identity data in a separate identify directory that is not well integrated with application data used by applications that access the X.500 directory. Thus, categorization of identity data, relationships between portions of identity data, and relationships between application data and portions of identity data are typically poorly reflected in these data structures.

BRIEF SUMMARY

The present invention extends to methods, systems, and computer program products for modeling party identities in computer storage systems. A federated identity fabric models identity data and relationships between portions of identity data in computer storage systems. The identity and identity relationship data is modeled in accordance with a logically uniform schema. The logically uniform schema can represent the existence of any entity that can be unambiguously identified. For example, an application in one computing environment can readily store, access, modify, delete, and secure identity and identity relationship data provided by another computing environment since the identity data is modeled in accordance with the logically uniform schema.

As such, the federated identity fabric can federate distributed identity and identity relationship data from computer storage systems within the variety of different computing environments. Code and metadata at computing environments associated with the federated identity fabric can interoperate to facilitate uniformly storing, accessing, modifying, deleting, and securing identity and identity relationship data within the federated identify fabric. For example, an application in one computing environment can readily store, access, modify, delete, and secure identity data provided by another computing environment since the identity data is modeled in accordance with the logically uniform schema.

In some embodiments, the federated identify fabric is utilized to locate identity related data. A first data object is created within a data structure. The first data object represents an entity from the physical or digital world, within the data structure. The data structure is capable of representing, through the logically uniform schema, the existence of any entity that can be unambiguously identified.

The first data object is stored into the federated identity fabric. A second data object is created. The second data object represents an unambiguous identifier used within the federated identity fabric. The second object is inserted into the federated identity fabric. The second data object is related to the first data object. Accordingly, that the second data object can subsequently be used to locate the first data object.

The unambiguous identifier is subsequently used as a template for locating the second data object. The relationship between the first data object and the second data object is then used to locate the first data object subsequent to using the unambiguous identifier to locate the second data object. Identity related data for the entity is retrieved from the first data object.

Embodiments of the invention can model parties, roles, persons, organizations, groups, locations, services, devices, authorities, taxonomies, and identity keys in an identity model. Definitions of and relationships between these objects represented in the identity model can be used to derive an efficient storage mechanism in computer storage systems. The identity model provides a mechanism to integrate and consistently maintain these objects.

Accordingly, in some embodiments, an identity key (e.g., the second data object) is used to access identity related data for a party (e.g., the first data object). In other embodiments, one identity key (e.g., the second data object) is used to access identity related data from another identity key (e.g., a third data object).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
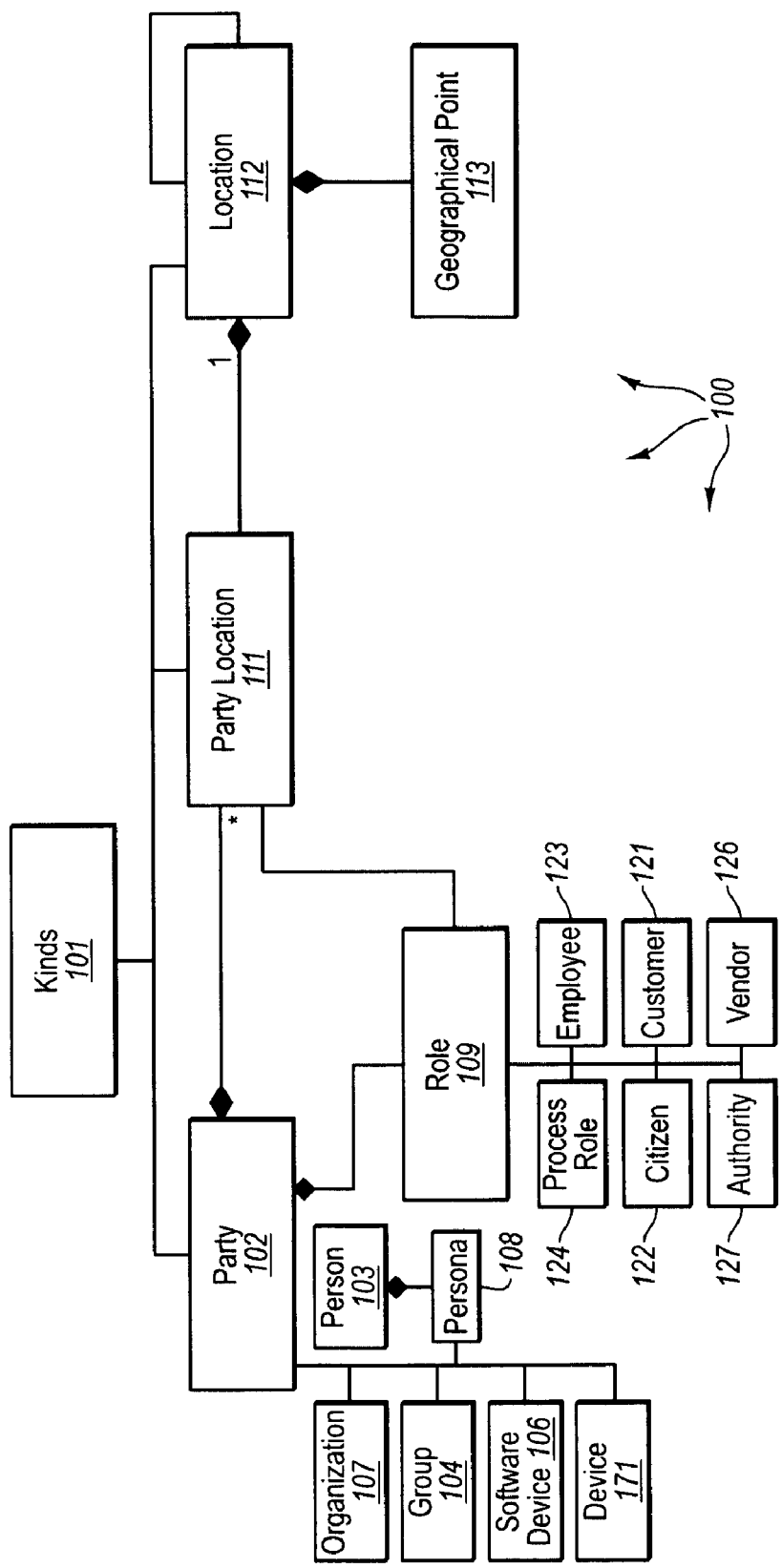
FIGS. 1A-1D illustrates an example schema that can be used to model identity data for storage in computer storage systems.

The present invention extends to methods, systems, and computer program products for modeling party identities in computer storage systems. A federated identity fabric models identity data and relationships between portions of identity data in computer storage systems. The identity and identity relationship data is modeled in accordance with a logically uniform schema. The logically uniform schema can represent the existence of any entity that can be unambiguously identified. For example, an application in one computing environment can readily store, access, modify, delete, and secure identity and identity relationship data provided by another computing environment since the identity data is modeled in accordance with the logically uniform schema.

As such, the federated identity fabric can federate distributed identity and identity relationship data from computer storage systems within the variety of different computing environments. Code and metadata at computing environments associated with the federated identity fabric can interoperate to facilitate uniformly storing, accessing, modifying, deleting, and securing identity and identity relationship data within the federated identify fabric. For example, an application in one computing environment can readily store, access, modify, delete, and secure identity data provided by another computing environment since the identity data is modeled in accordance with the logically uniform schema.

In some embodiments, the federated identify fabric is utilized to locate identity related data. A first data object is created within a data structure. The first data object represents an entity from the physical or digital world, within the data structure. The data structure is capable of representing, through the unified schema, the existence of any entity that can be unambiguously identified.

The first data object is stored into the federated identity fabric. A second data object is created. The second data object represents an unambiguous identifier used within the federated identity fabric. The second object is inserted into the federated identity fabric. The second data object is related to the first data object. Accordingly, that the second data object can subsequently be used to locate the first data object.

The unambiguous identifier is subsequently used as a template for locating the second data object. The relationship between the first data object and the second data object is then used to locate the first data object subsequent to using the unambiguous identifier to locate the second data object. Identity related data for the entity is retrieved from the first data object.

Embodiments of the invention can model parties, roles, persons, organizations, groups, locations, services, devices, authorities, taxonomies, and identity keys in an identity model. Definitions of and relationships between these objects represented in the identity model can be used to derive an efficient storage mechanism in computer storage systems, such as, for example, database servers (e.g., a SQL Server database), in-memory data structures, etc. The identity model provides a mechanism to integrate and consistently maintain these objects.

Accordingly, in some embodiments, an identity key (e.g., the second data object) is used to access identity related data for a party (e.g., the first data object). In other embodiments, one identity key (e.g., the second data object) is used to access identity related data from another identity key (e.g., a third data object). That is, given a first object 'A', a second object can be viewed as the identity of 'A'. A third object can be another identify key of 'A'.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Accordingly, embodiments of the invention include including a plurality of computer systems connected to one another over (or that are part of) a network, such as, for example, a Local Area Network ("LAN"), a Wide Area Network ("WAN"), and even the Internet. Applications at least some of the plurality of computer systems can maintain identity and identity relationship data in accordance with a uniform identity model schema. Thus, identity and identity relationship data can be distributed across a variety of different computing environments (e.g., one or more of different applications, different computer systems, different contexts, different networks, etc.).

Each of the computer systems can also create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Object Access Protocol ("SOAP"), etc.) over computer networks. Using network (or even system bus) messaging, applications maintaining identity and identity relationship data can federate to produce a federated identity fabric. Since each application modeling identity and identity relationship data does so in accordance with a uniform identity model schema, the collective identity and identity relationship data within the federated identity fabric is also modeled in accordance with a uniform identity model schema. Accordingly, identity and identity relationship data can be exchanged across applications through the federated identity fabric.

Accordingly, the federated identity fabric can federate identity and identity relationship data distributed across computer storage systems within the variety of different computing environments. Computer-executable instructions and metadata at computing environments associated with the federated identity fabric can interoperate to facilitate uniform storage, access, modification, deletion, and security for identity and identity relationship data within the federated identify fabric.

FIGS. 1A-1D illustrates an example schema 100 that can be used to model identity data for storage in computer storage systems. The schema represents information about digital subjects and resources that have relationships. Schema 100 is a logically uniform schema that can have varied implementations. That is, any of a variety of schema implementations can be utilized to realize the relationships in example schema 100. Different Kinds 101 of digital subject can share many of the same characteristics—while being different. The schema represents the common aspects of all digital subjects through an entity called a Party. A Party can then be specialized as depicted in FIG. 1A. For example, FIG. 1A depicts a Party entry that has a name, a description, a time, span, and PrimaryKind (e.g., Person, Organization, Group, Software Service, or Device). Parties can also have a SecondaryKind. For example, an Organization can have a SecondaryKind of Corporation or Government.

A party type 102 is defined by one of organization 107, person 103, group 104, service 106, and device 171.

FIG. 1A depicts a portion of a schema 100 for modeling a party. As depicted in FIG. 1A, party type 102 is defined to be one its specializations (as an organization, a person, a device, a software service, or a group), one or more party locations, and one or more relationships to and from other parties.

Parties may have relationships between them. Each party to party relationship is defined by a party to party relationship.

Each party location is defined by party location 111, representing locations a party can be located at. Each party location 111 is defined by a location 112 refined from one or more parent locations. Each location 112 is defined by a variety of geographical points 113. Thus, Parties may be located at more than one Location. For each Location at which the Party is located, there exists information, such as the start date and end date denoting the duration of time that the party was associated with that Location, which must be recorder. In the model, these facts are recorded as instances of the type Party Location, which denotes the facts concerning one Party with respect to one Location. Locations may be further defined by a set of geographic coordinates, such as latitude and longitude values.

A person can be defined by an amalgam of personas 108. Thus, Persons are an amalgam of Personas. A Persona instance contains personal information, such as, for example, personal name, gender, and photo, along with reference to the Party to which the Persona pertains. This allows multiple Personas (potentially also of different Kinds) to be aspects of the same 'Person' Party (one of the Personas being marked as the default) by following references from the Persona to Party. Accordingly, the notion of an individual may be the collective aggregate values of properties across one or more of these Personas. For example, an individual person Jane Smith may own multiple Personas which she uses while logged on to different websites, multiple Customer roles which she maintains for her presence at different shopping websites, and an Employee role representing her employment with Microsoft. Jane Smith the real person is an instance of a Person type of Party, but anyone wishing to know different facets of Jane Smith must be allowed to inspect all instances of all types of Persona, which describe those different facets of the individual. Parties can act or be acted upon. In some embodiments, to be acted upon a party is able to act at least to an extent necessary to provide its identity Schema 100 calls out a specialization of PartyToPartyRelationships called Roles. Roles provide a way to define and add information about aspects of a Party that is specific to a given relationship. FIG. 1A portrays examples of roles 109 that a Party can play: Employee 123, Customer 121, Citizen 122, Vendor 126, Authority 127 and ProcessRole 124. Whereas the specializations of Party can be mutually exclusive, Roles are amalgamated. Thus, a party can, and frequently does, have a plurality of different roles.

Roles hold a reference to the Party which "plays" the Role in addition to a reference known as the ContextParty which refers to the Party for whom the Role is played. Roles may have a StartDate, EndDate and Kind. Thus, for example, a Person's entire job history at a given organization can be modeled as a set of Employee Roles between the same Person and ContextParty, retaining full knowledge of when each position began and ended. The same schema can model all the jobs held by a Person at multiple Organizations, or a single job at a single Organization, or even all the People who have held some job over time.

The same Person can be represented through different Personas in different contexts—for example, a "home" persona and a "work" persona. When combined with the relevant Roles (e.g. Citizen—potentially of more than one country; Employee information; etc) information relevant to many aspects of a person can be represented.

The depicted party types and role types are some examples of the different types of parties and roles that can be exchanged between applications associated with a federated identify fabric. However, other types of parties and roles can also be defined. For example, an organization can be a customer of another organization. Likewise, a person can be a "member" of an organization.

Thus, more generally, a party has concrete refinements named organization, person, group, software service and device. Party represents the common properties of its concrete refinements each of which has specialized properties that further characterize the specific concept. For example, software services represent parties that are software agents and computer programs.

Figure 1B:
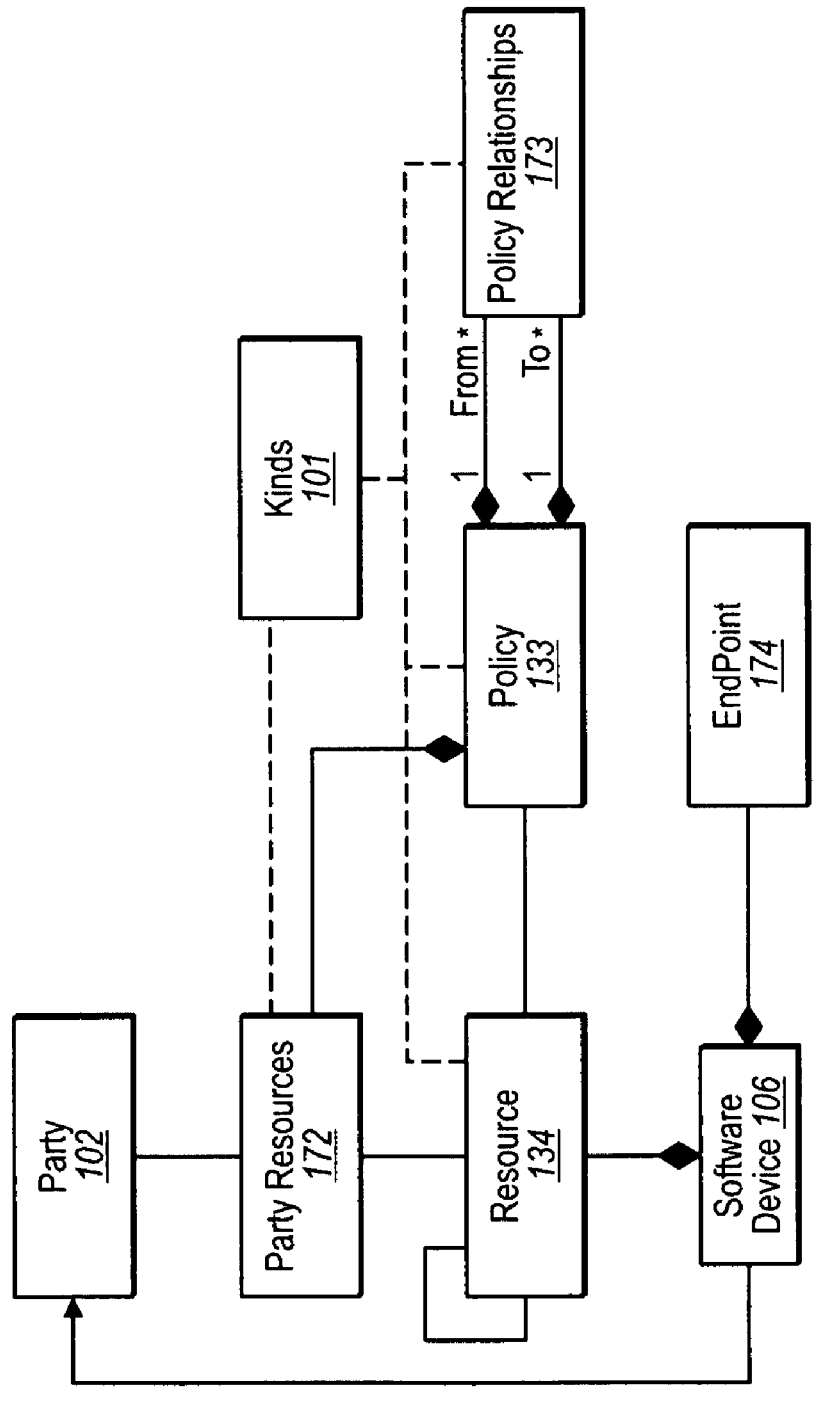

FIG. 1B depicts a portion of a schema 100 for modeling policies and resources. One capability of the Identity schema is to provide the basis for a distributed Policy Store. Policy 134 is used to facilitate and control the actions of Parties on Resources. In general, the Service providing access to a Resource 134 employs Policy 133 to determine whether and how a Party 102 can access it.

A resource (defined by resource 134) can be owned by many parties, each of which may control one or more resource. A PartyResource 172 represents an instance of a relationship between Party 102 and Resource 134 by specifying a reference to a particular Resource and to a particular party (defined by party 102). The set of Policies which govern access to a particular resource are referenced by an instance of PartyResource 172.

During access control, at least two policy evaluations can be made. The first is to ensure that access conforms to the Policy associated with the Resource. The second is to ensure that access conforms to the Policy specified in the PartyResources relationship—in other words, applicable to the subject Party accessing the given Resource.

For example, the Policy associated with a Sales Report might say every member of an Organization can access it with Read permission. The PartyResources relationship between a Sales Group Party and the Sales Report Resource might specify an additional policy of "Write permission when on premise". Access would be gated by the combination of these policies. Schema 100 provides for each of these Policies being composed of other Policies as specified through PolicyRelationships 173 so as to allow reuse of Policy components.

Software service 106 and endpoint 174 indicate that a Resource 134 can be defined as a Software Service Endpoint.

Figure 1C:
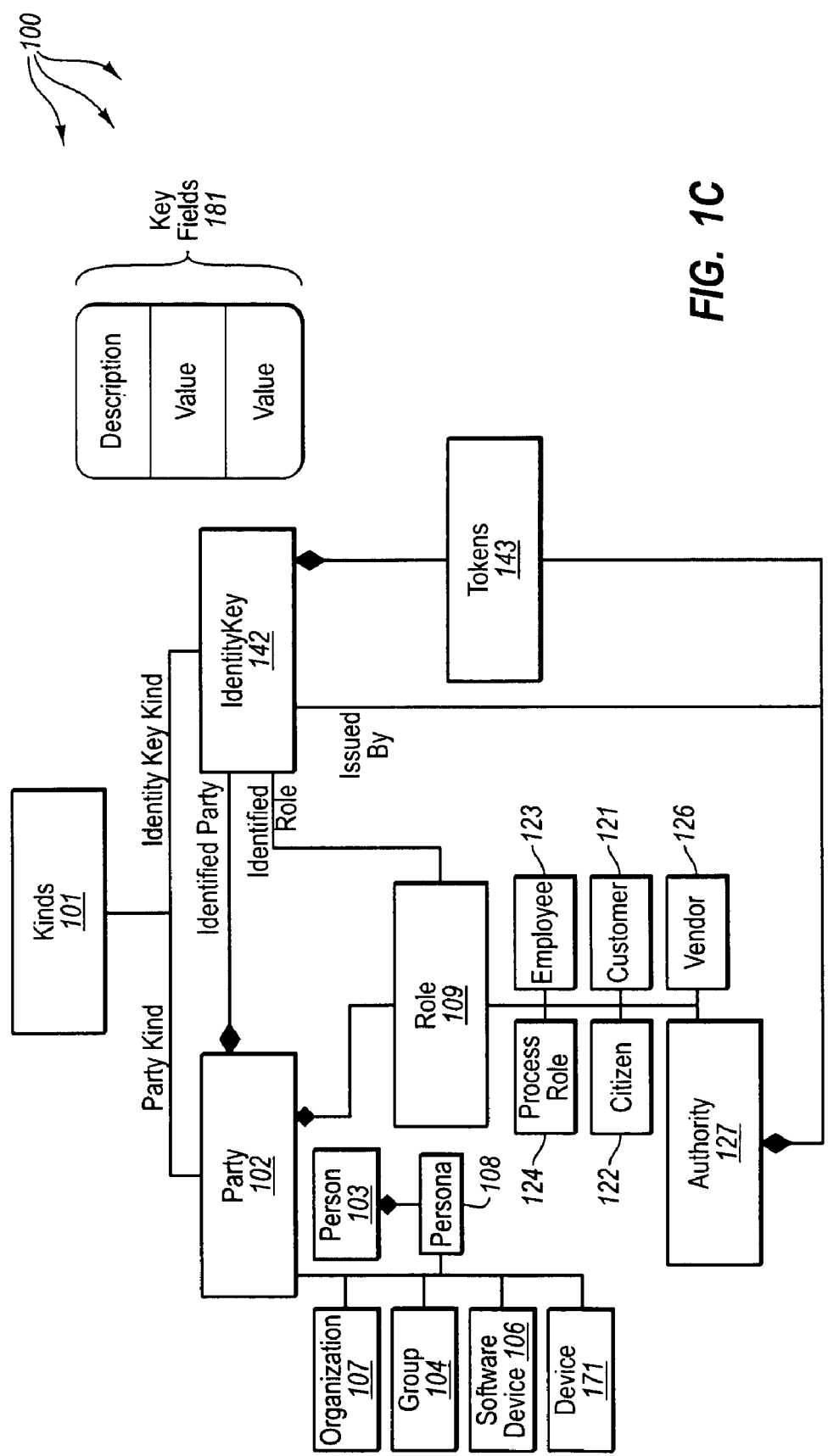

FIG. 1C depicts a portion of a schema 100 for modeling identity keys. Generally, an identity key can be associated with a set of tokens, each of which supports zero or more claims. Each claim can be an encoding of an assertion that the bearer of the token be permitted to perform specific actions against specific resources.

As depicted in FIG. 1, each of the different types (person 103, group 104, software service 106, organization 107, and device 171) of parties (defined by party 102) can have one or more identity keys. An identity key is defined by IdentityKey 142, is assigned by an authority (defined by authority 127) and includes one or more tokens. A token is defined by token 143 and can include one or more security claims. Various portions of this data, such as, for example, a description, a value, and a time window, can be represent in key fields 181.

Figure 1D:
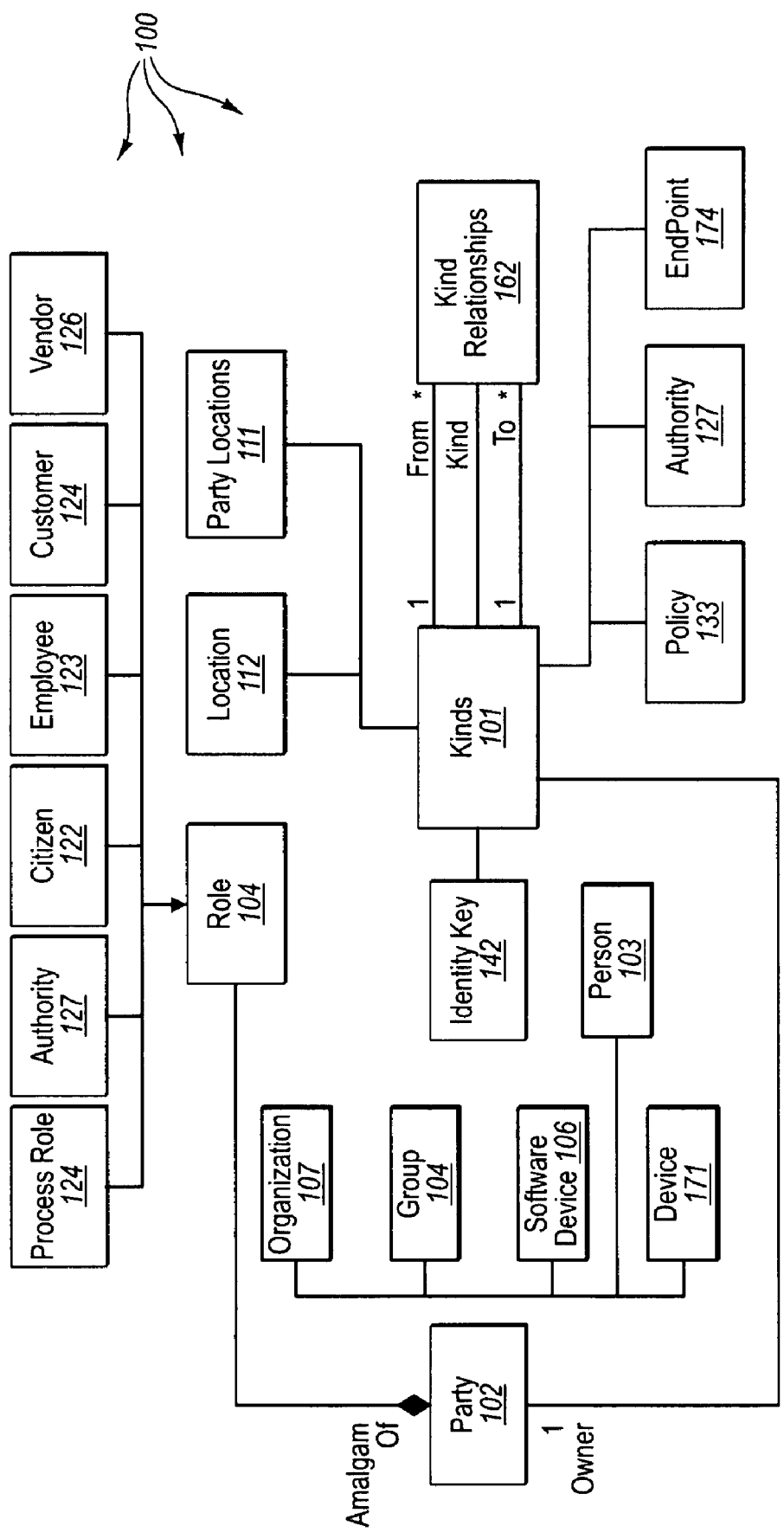

FIG. 1D depicts a portion of a schema 100 for modeling taxonomies. Generally, taxonomy entries are categories that can be used to describe what type of thing a concept is. For example, there are different Kinds of Parties 102, different Kinds of Roles 109, different Kinds of PartyToPartyRelationships, different Kinds of IdentityKeys 142 and different Kinds of Locations 112. In schema 100, a taxonomy entry is called a Kind 101. For example, one kind of identity key might be an email alias. Another kind of identity key might be a Federal Social Security Number. The categorization of each identity key would be recorded by an association between instances of identity key and instances of kind.

As depicted in FIG. 1D, kinds can be formulated for each of the different types (person 103, group 104, software service 106, organization 107, and device 171) of parties (defined by party 102) can have one or more identities defined by an identity key. Kinds can also be formulated for policies 133, authorities 127, and identity keys 142. Relationships between kinds are defined by kind relationships 162.

Thus, kinds generally form a polyarchy (i.e., each kind can have a plurality of parent categories that are also kinds). However, hierarchically arranged kinds are also possibly (i.e., each kind has one parent category that is also a kind). Associations, such as "parent", are represented as kind relationships. Kind Relationships themselves may be categorized, and hence may also be associated with a kind that represents the kind of relationships between kinds.

For example, an address (a Kind) may be said to be a type of Location. A mailing address and a billing address (each of which is a kind) can be viewed as more refined definitions of an address than the notion of address. Address may be recorded as the parent of mailing address and billing address by two instances of kind relationship 162—one from mailing address to address, the other from billing address to address. These instances of taxonomy relationship may be categorized as ParentOf by reference to a kind whose content is RefinementOf (which may itself be associated by a further kind relationship instance that categorizes RefinementtOf to be a type of StructuralRelationship which itself is a kind.

Accordingly, embodiments of the invention utilize the notion of a party and its more concrete refinements—person, organization, group, service, device and service—which can be used where references to parties are used. Parties may represent objects from the physical world or digital world and may represent both consumers and suppliers of services, including digital services offered by authorities.

Representations of parties are deepened through the notion of roles which can be played by a party. Each such role references the party which plays it. Roles may also reference some context to which they apply, for example, some other party. For example, "employee" is a role that could be played by one party (e.g., a person) with respect to another (e.g., an organization). In one embodiment, a person itself is nothing other than an amalgam of separate Roles which people can play—for example, a citizen, a customer, an employee, a process role, and a private person.

A single party may play multiple types of Roles. For example, a person can be an employee as well as a citizen (different types of roles). A party can also be in more than one of the same type of role. For example, a person can play two employee roles, each for a different organization. A party can be in the same type of role—and in the same context—but over different, possibly overlapping, time spans. Parties typically support different types of party-to-party relationships (such as "friend of", subordinate, supervisor, etc.).

Each of the parties and the separate roles a party plays may be uniquely identified in a number of different ways—for example, using an email address, a federal identifier, an employee number, and so on. Embodiments of the invention include representing unique identifiers with an identity key data type. Identity key data types indicate the secure identities of individual parties (the security characteristics being variable), for example, issued by a known Authority (which itself is a role played by some Party).

Identity keys can be differentiated through unique values of a given type and reference the relevant party. One benefit is that an identity key of any given type can be efficiently located through presentation of any other identity key, and the references to the relevant party and associated role efficiently obtained. Thus, the use of identity keys permits customization of digital experience—for example, permissions to access individual data.

Embodiments of the invention also utilize a location type to support different kinds of physical and virtual places at which parties may be located. Locations may be described using text fields (as in an Address) or using geographic coordinates. Since parties, locations, and identity keys can exist in a large number of and can be of very different kinds, a taxonomy mechanism, previously described as Kinds, can be used to define and record the varying types of each. As previously described, kinds can be polyarchical or hierarchical and can themselves be taxonomized (that is, there can be kinds of kinds).

The use of different types of parties and locations in tandem with different types of identity keys and different types of party to party relationships provides benefits related to dividing up information related to extremely large numbers of parties across the many machine boundaries needed to represent information at, for example, world scale. These benefits facilitate location within relatively large (and potentially massive) object spaces, and most important, representation of relationships—through references—across those spaces.

The data structures and mechanisms, defined above may be implemented efficiently in many different kinds of computer storage including database on disks and in memory. Computer storage can be used to represent a logically centralized repository. A federated identity fabric can represent a logically centralized repository when identity data is distributed across a plurality of different computing environments. Computer systems in the different computing environments can include computer-executable instructions and metadata for composing the federated identity fabric. As such, the computer-executable instructions and metadata at the computer systems can interoperate to compose the federated identity fabric and reflect a centralized repository back the computer systems.

The centralized repository can store the data structures and mechanisms (e.g., applications and services) in accordance with various data models of schema 100. Thus, applications and services built upon and/or integrated into the centralized repository can be configured to process data in accordance with the various data models. As a result, applications and services can share object-centric data, such as, for example, identity related data, with one another.

Embodiments of the invention also provide consistent access to information across varied contexts, devices, and scales from a variety of different perspectives. For example, an individual can consistently access his or her information via a wireless Internet connection using a cell phone while traveling in India or via a corporate LAN connection using a desktop computer system in an office in the United States. Services and applications that process such communication can have embedded computer-executable instructions and metadata for processing identity related data defined in accordance with the various data models of schema 100. Accordingly, functionality to navigate across scales, devices, and contexts can be included as components within a federated (e.g., logically unified) identity fabric.

Embodiments of the invention provide access to information through replication and caching of data employing the same data structures used to master it and metadata facilitating replication. Replication and caching provide efficient alternatives to employing telecommunications systems in real time to access information stored elsewhere in a network, including the Internet. For example, the identity information of parties related to Jane Doe, including the partytoparty relationships, identity keys, location information and more, could be replicated, in the same logical structure as used elsewhere, onto her cell phone. Thus, applications on her cell phone can also process identity data efficiently even when communication with a central location is difficult or expensive. Further, the amalgam of information she carries with her may represent a different co-location of information objects than that present in other data stores (i.e. different devices and sets of devices may contain different groupings of the shared information objects).

Figure 2A:
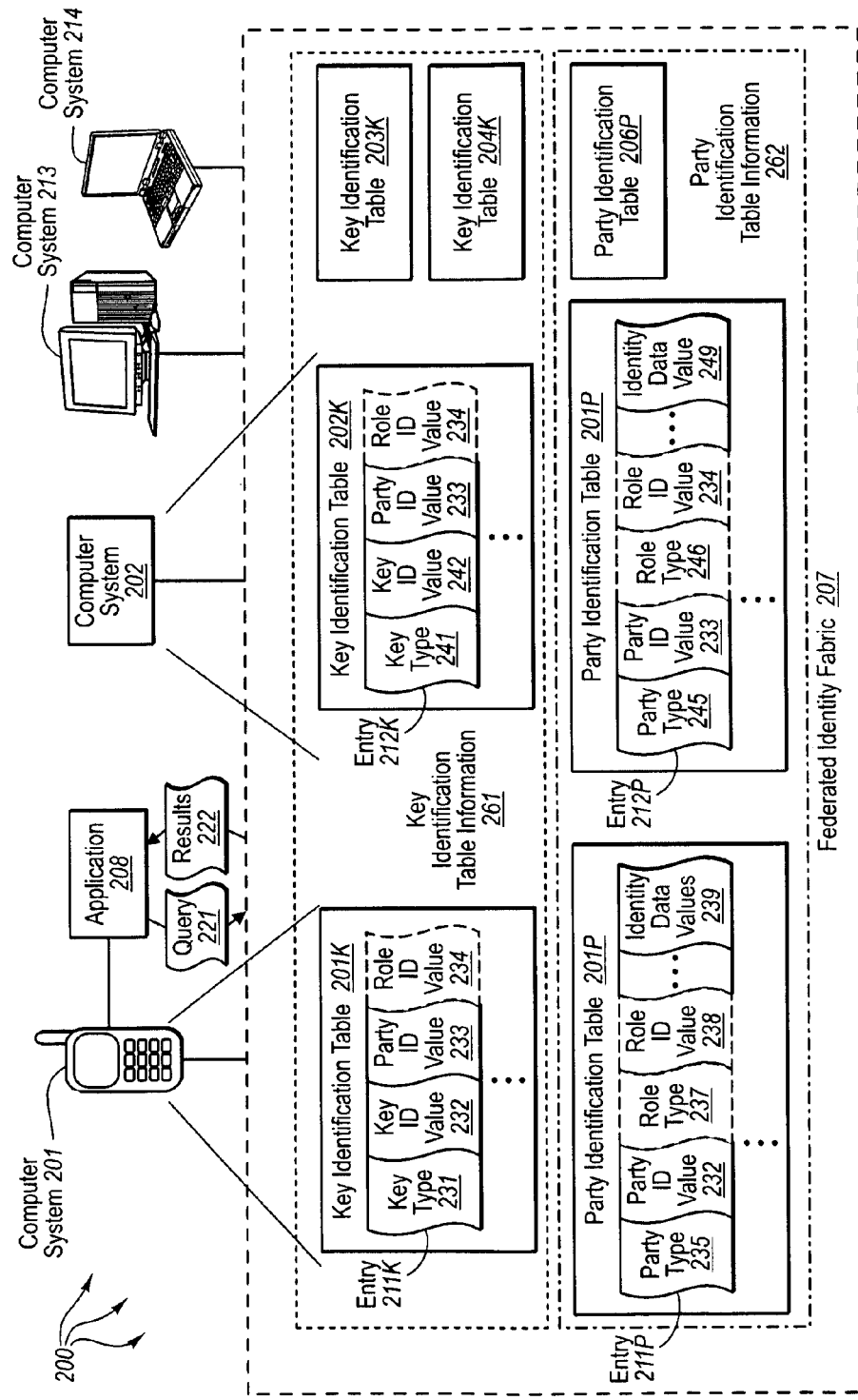
FIG. 2A illustrates an example computer architecture that facilitates modeling identity information in computer storage systems.

FIG. 2A illustrates an example computer architecture 200 that facilitates modeling identity information in computer storage systems. As depicted in computer architecture 200, computer systems 201, 202, 213, and 214 are connected to federated identity fabric 207. Each of computer systems 201, 202, 213, and 214 can include applications having computer-executable instructions and metadata for composing and associating with federated identity fabric 207. For example, each of computer systems 201, 202, 213, and 214 can include applications having computer-executable instructions and metadata for presenting federated identity fabric 107 as a centralized repository of identity data to other applications at each of computer systems 201, 202, 213, and 214 respectively. Each of computer systems 201, 202, 213, and 214 can also include applications having computer-executable instructions and metadata to interoperate with federated identify fabric 207 to facilitate uniform storage, access, modification, deletion, and security for identity and identity relationship data within federated identify fabric 207.

For example, computer system 201 can maintain key identification table 201K and party identification table 201P locally, such as, for example, on disk or in system memory. Key identification table 201K can include one or more key identification entries defined in accordance with the model in FIG. 1C. For example, entry 211K includes key type 231 (e.g., email alias), key ID value (e.g., jdoe@test.com), party ID 233 (an ID corresponding to the person having the email alias of jdoe@test.com), and optionally role ID 234 (an ID corresponding to the role the person identified by party ID 233 is in for the email alias of jdoe@test.com).

Party identification table 201P can include one or more party identification entries defined in accordance with the model in FIG. 1A. For example, entry 211P includes party type 235 (the type of party selected from organization, person, group, service, and device), party ID value 236 (the ID value for the party type), role type 237 (a type of role from the those defined for the party type, such as, for example, customer, basic citizen, employee, process role, private person, authority, etc.), and role ID value (the ID value for the role type). Entry 211P can also include one or more locations and party to party relationships as appropriate. Entry 211P also includes identity data values 239. Identity data values 239 represent the data for the party, such as, for example, a display name. Identity data values 239 can include any data associated with a party and may or may be represented in identity keys for the party. For example, a telephone number for a party can be used in an identity key but might also be included in identity data values 239.

Applications at computer system 201 can also stitch key identification table 201K and party identification table 201P into federated identity fabric 207.

Similar applications at computer system 202 can stitch key identification table 202K and party identification table 202P into federated fabric identity 207. As depicted, key identification table 202K includes entry 212k including key type 241, key ID value 242, party ID value 233, and optionally role ID 234. Since entry 212K includes party ID 233 and potentially role ID 234, entry 212K can indicate a different type of key that corresponds to same party associated with key type 231 (i.e., party ID value 233 and/or role ID 234 link entry 211K and 212K).

Also as depicted, party identification table 202P includes entry 212P including party type 245, party ID value 233, role type 246, role ID 234, other fields, and identity data values 249. Since entry 212P includes party ID 233 and potentially role ID 234, key entries associated with party ID value 233 and/or role 234 can be used to locate identity data values 249.

Similar applications at other computer systems (e.g., potentially computer systems 213 and 214) can stitch key identification tables 203K and 204K and party identification table 206P into federated identity fabric 207.

Applications at computer system 201 can also present federated indentify fabric 207 as a central repository to other applications at computer system 201 (e.g., application 208). Thus, applications at computer system 201 can collectively view key identification tables 201K, 202K, 203K, and 204K as key identification table information 261. Similarly, applications at computer system 201 can collectively view party identification tables 211P, 212P, and 206P as party identification table information 262. Computer systems 202, 213, and 214 can have applications providing similar functionality. Accordingly, applications at any of computer systems 201, 202, 213, and 214 can securely access, modify and delete identity and identity relationship data within federated identify fabric 207 in accordance with the definitions in schema 100.

Figure 3:
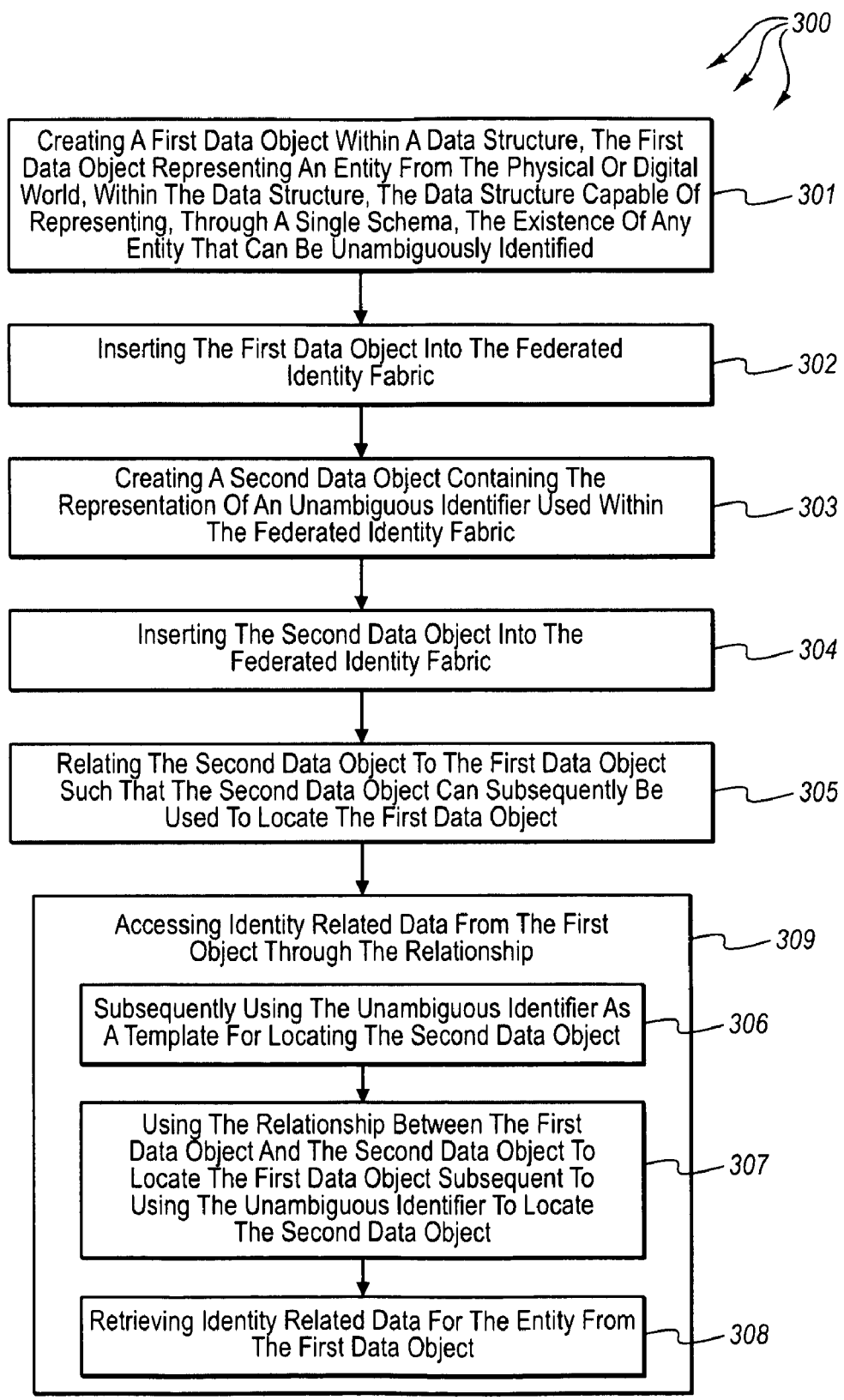
FIG. 3 illustrates a flow chart of an example method for modeling and accessing modeled identity data from computer storage systems.

FIG. 3 illustrates a flow chart of an example method for modeling and accessing modeled identity data from computer storage systems. Method 300 will be described with respect to the components and data in FIG. 2A and the definitions in schema 100.

Method 300 includes an act of creating a first data object within a data structure, the first data object representing an entity from the physical or digital world, within the data structure, the data structure capable of representing, through a logically uniform schema, the existence of any entity that can be unambiguously identified (act 301). For example, computer system 202 can create entry 212P in party identification table 202P. Entry 212P can represent an organization in accordance with the data model in FIG. 1A. Method 300 includes an act inserting the first data object into the federated identity fabric (act 302). For example, computer system 202 can stitch entry 212P into federated identity fabric 207.

Method 300 includes an act of creating a second data object containing the representation of an unambiguous identifier used within the federated identity fabric (act 303). For example, computer system 202 can create entry 212K. Various characteristics of entry 212K, such as, for example, a combination of field values, can be used to represent an unambiguous identifier for entry 212K within federated identity fabric 207. Method 200 includes an act of inserting the second data object into the federated identity fabric (act 304). For example, computer system 202 can stitch entry 212K into federated identity fabric 207.

Method 300 includes an act of relating the second data object to the first data object such that the second data object can subsequently be used to locate the first data object (act 305). Inclusion of the same value in two different entries can be used to relate the entries to one another. For example, the reference to party ID value 233 in entry 212K and in entry 212P relates entries 212K and 212P to one another. Thus, entry 212K can be used to locate entry 212P (and potentially vice versa).

Method 300 includes a functional result oriented step for accessing identity related data from the first object through the relationship (step 309). Step 309 can include virtually any corresponding acts to achieve the result of accessing identity related data from the first object through the relationship. However, in method 300, step 309 includes a corresponding act of subsequently using the unambiguous identifier as a template for locating the second data object (act 306). For example, application 208 can send query 221 to federated identity fabric 207. Query 221 can include the unambiguous identifier for entry 212K. Federated identity fabric 207 can receive query 221 from application 208. Federated identity fabric 207 can use the unambiguous identifier to locate entry 212K.

In method 300, step 309 also includes an act of using the relationship between the first data object and the second data object to locate the first data object subsequent to using the unambiguous identifier to locate the second data object (act 307). For example, federated identity fabric 207 can use a field value from entry 212K (e.g., party ID value 233) to locate entry 212P subsequent to using the unambiguous identifier to locate entry 212K.

In method 300, step 309 also includes an act of retrieving identity related data for the entity from the first data object (act 308). For example, federated identity fabric 207 can retrieve identity related data from entry 212P. Identity related data can include information generic to any kind of party, information stored using a schema for the particular kind of party that has been located, information about the relationship of party has to any other party of any other type, or information about alternate unambiguous identifiers related to the same party.

Figure 2B:
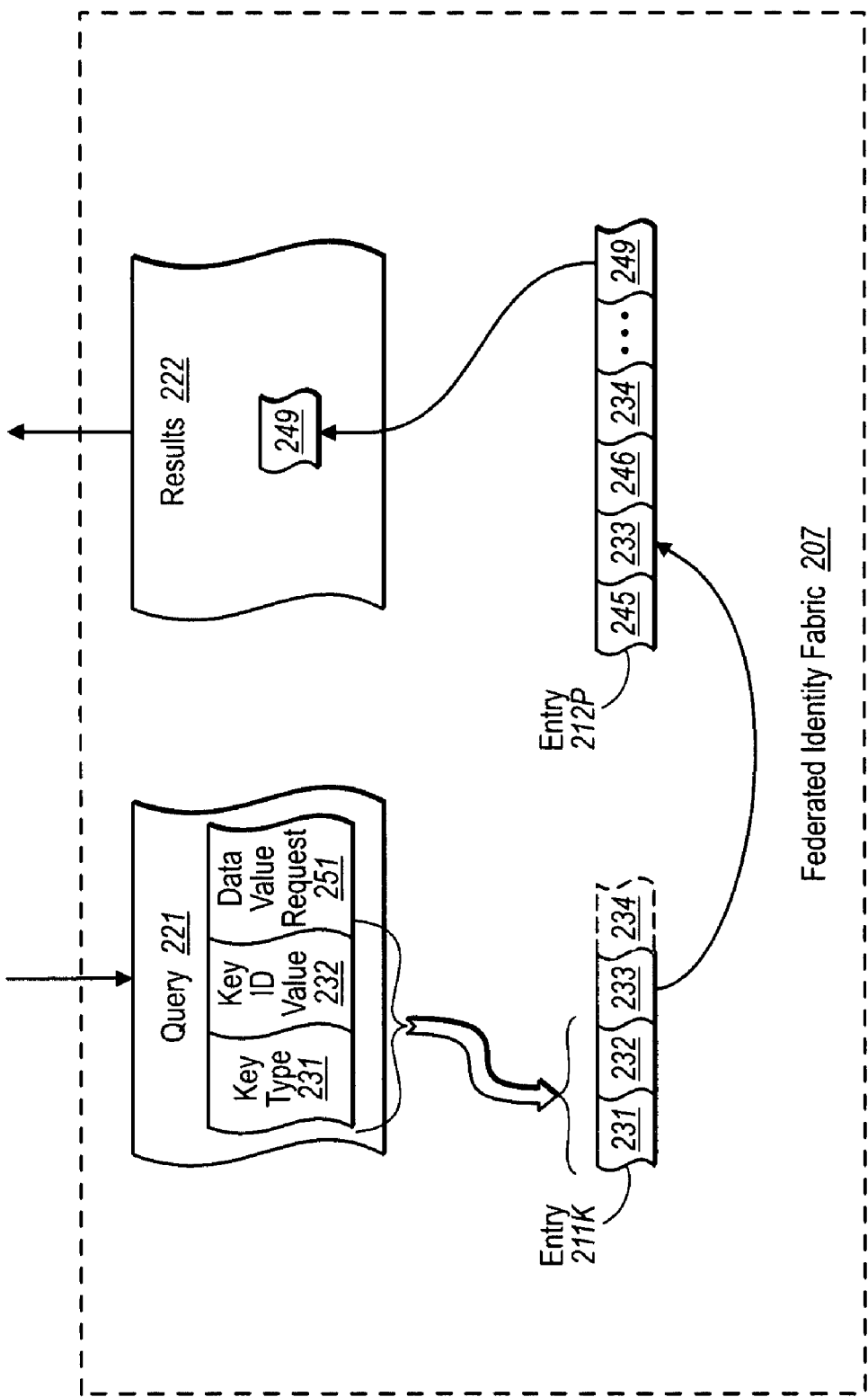
FIG. 2B illustrates a portion of the computer architecture of FIG. 2A for accessing party identity data form a key identifier FIG. 2C a portion of the computer architecture of FIG. 2A for transforming key identifiers.
Figure 4:
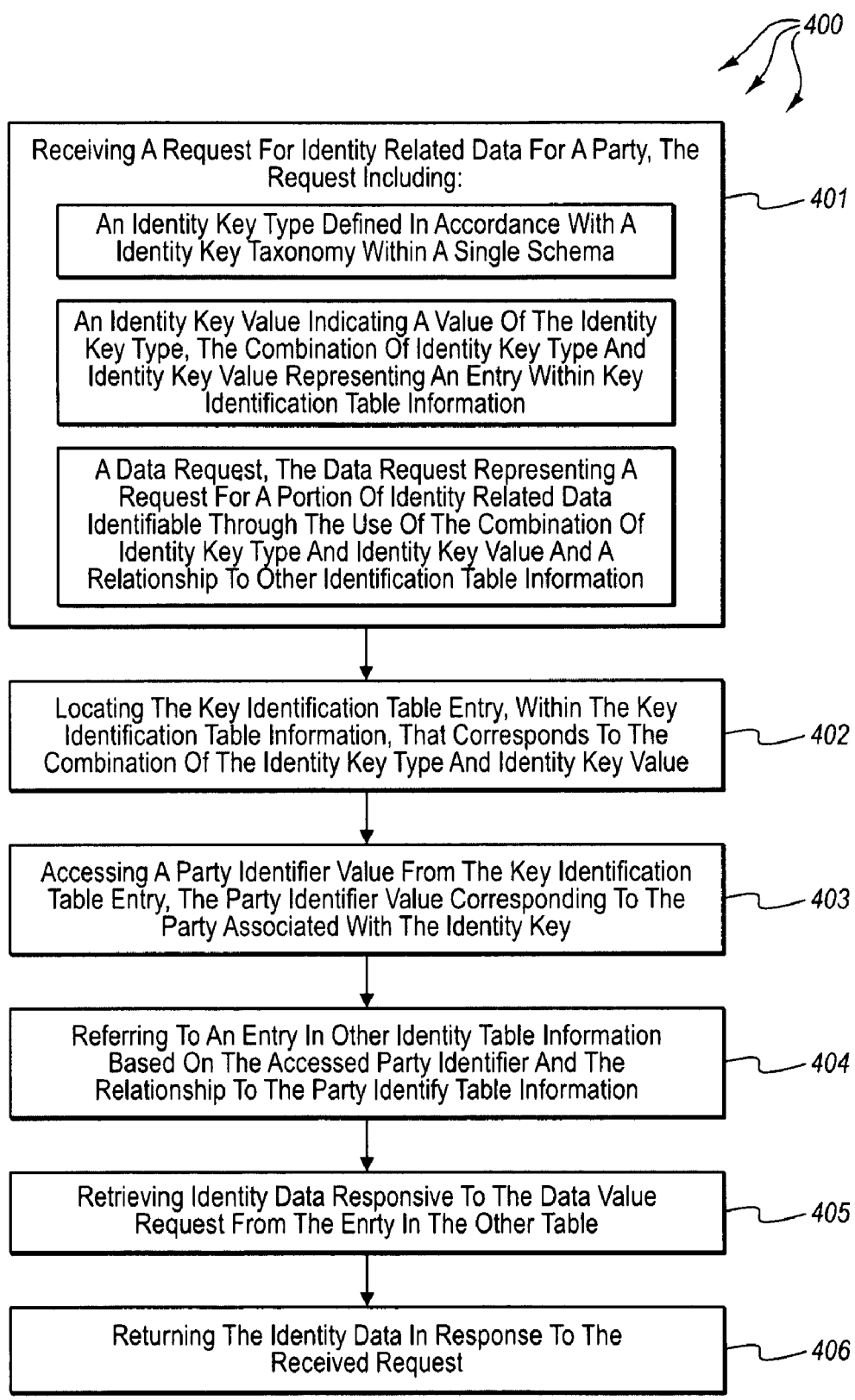
FIG. 4 illustrates a flow chart of an example method for accessing modeled identity data from computer storage systems.

Another example of corresponding acts that can be used to achieve the result of accessing identity related data from the first object through a relationship (i.e., step 309) is depicted in FIG. 4. FIG. 4 illustrates a flow chart of an example method 400 for accessing modeled identity data from computer storage systems. FIG. 2B illustrates a portion of the computer architecture 200 for accessing party identity data from a key identifier. Method 400 will be described with respect to the components and data in FIGS. 2A and 2B.

Method 400 includes an act of receiving a request for identity related data for a party (act 401). For example, referring to FIG. 2B federated identity fabric 207 can receive query 221. The request can include an identity key type defined in accordance with a identity key taxonomy within a single schema. The single schema is capable of representing the existence of any entity that can be unambiguously identified. The request can also include an identity key value indicating a value of the identity key type. The combination of identity key type and identity key value representing (unambiguously) an entry within key identification table information. For example, as depicted in FIG. 2B, query 221 includes key type 231 and key ID value 232. Referring briefly back to FIG. 2A, the combination key of type 231 and key ID value 232 unambiguously represents (or is an unambiguous identifier for) entry 211K within key identification table information 261.

The request can also include a data request. The data request represents a request for a portion of identity related data through the use of the combination of identity key type and identity key value and a relationship to other identification table information. In some embodiments, the request is a data value request. The data value request represents a request for a portion of party related identity data from a party table entry identifiable through the use of the combination of identity key type and identity key value and a relationship to party identification table information.

For example, as depicted in FIG. 2B, query 221 includes data value request 241. Data value request 251 represents a request for a portion of party related identity data from a party table entry identifiable through the use of the combination of identity key type 231 and identity key value 232 and a relationship to party identification table information 262.

Method 400 includes an act of locating the key identification table entry, within the key identification table information, that corresponds to the combination of the identity key type and identity key value (act 402). For example, federated identity fabric 207 can locate entry 221K, within key identification table information 262, that corresponds to the combination of key type 231 and key ID value 232. Method 400 includes an act of accessing a party identifier value from the key identification table entry, the party identifier value corresponding to the party associated with the identity key (act 403). For example, federated identity fabric 207 can access party ID value 233 from entry 211K.

Method 400 includes an act of referring to an entry in other table information based on the accessed party identifier and the relationship to the party identifier (act 404). For example, federated identity fabric 207 can refer to entry 212P (in party identification table 202P) based on party ID value 233 being included in both entry 211K and entry 212P.

Method 400 includes an act of retrieving identity data responsive to the data request from the entry in the other table (act 405). For example, federated identity fabric 405 can retrieve identity data values 249 (e.g., a display name) from entry 212P. Identity data values 249 can be responsive to data value request 251. Method 400 includes an act of returning the identity data in response to the received request (act 406). For example, federated identity fabric 207 can return results 222 (e.g., back to application 208), including data values 249, in response to query 221.

Alternately, a data request is a key type request. Embodiments of the invention include implementing method 400 for key type requests. The key type request represents a request for the corresponding key value of a second identity key type associated with a party. The second identity key type is also defined in accordance with the identity key taxonomy within the single schema. For example, referring now to FIG. 2C, key type 231 can be a key type for email alias and key ID value 232 can be jdoe@test.org. Further, query 221 includes key type request 271. Key type request 271 represents a request for a key identification entry of key type 241 within key identification table information 261. Key type 241 is also defined in accordance with schema 100. Key type 241 can be a key type for telephone number. Accordingly, query 221 can be a request for the telephone number of the party having the email alias jdoe@test.org.

Federated identity fabric 207 can then locate entry 221K, within key identification table information 262, that corresponds to the combination of key type 231 and key ID value 232. That is, federated identity fabric 207 locates a key entry for email alias that has a value of jdoe@test.org. Federated identity fabric 207 can then access party ID value 233 from entry 211K. Party ID value 233 represents the ID value for the party that has the email alias jdoe@test.org.

Federated identity fabric 207 can then refer to key identification table information 261 to locate entry 212K. Entry 212K is of key type 241 and includes party identifier 233. That is, entry 212K is an identity key for the telephone number for the party that has the email alias jdoe@test.org. Federated identity fabric 207 can then retrieve key ID value 242 (e.g., a telephone number) from entry 212K. Federated identity fabric 207 can return results 222 (e.g., back to application 108), including key ID value 242, in response to the query 221.

Figure 2C:
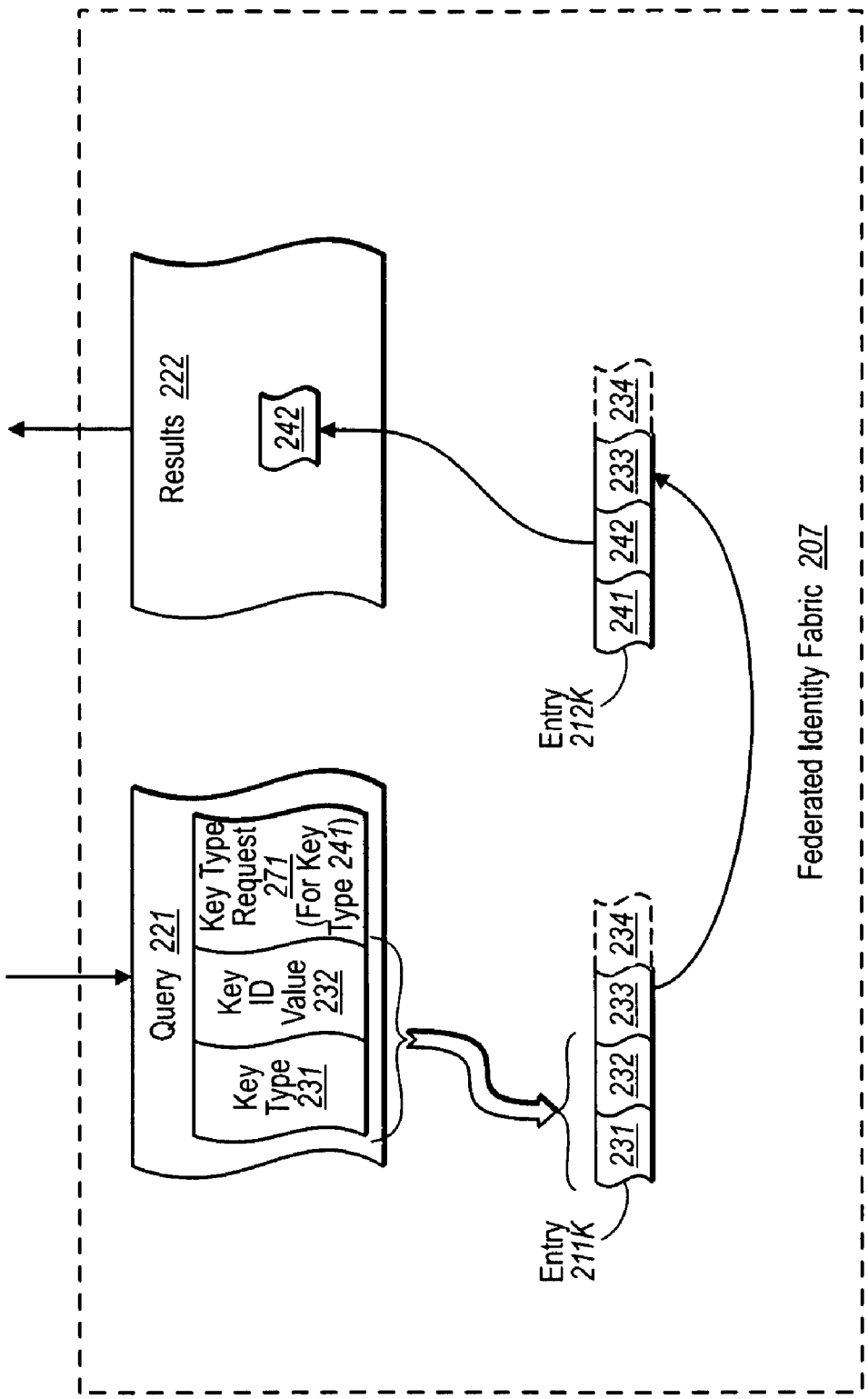

Accordingly, embodiments of the invention include utilizing an identity key table entry to locate party identity data (e.g., as depicted in FIG. 2B) and performing key transformations between different types of identity keys (e.g., as depicted in FIG. 2C). More generally, one data object (e.g., the second data object) can be a uniformly configured point of redirection to or indirection from another data object (e.g., the first data object). That is, the one data object can be configured to provide unambiguous identification of the other data object (e.g., through a configured relationship between the one and the other object). As such, existing objects which may not be unambiguously identifiable can still be unambiguously identified through the use of another related object that is unambiguously identifiable.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system connected to a federated identity fabric, the federated identity fabric modeling identity related information in computer storage systems, the federated identity fabric providing a consistent view of and access to identity information across a plurality of different applications, a plurality of different computer systems, a plurality of different contexts, and a plurality of different networks, a method for utilizing the federated identity fabric to locate identity related data, the method comprising:

an act of creating a first data object within a data structure, the first data object representing a party, the first data object including a party identifier that uniquely identifies the party, the first data object also including a plurality of role types that each identify a role played by the party, each of the role types having an associated role identifier;

an act of inserting the first data object into the federated identity fabric;

an act of creating a second data object containing a first identifier used by the party within the federated identity fabric, the second data object also including a role played by the party within the context of the first identifier associated with the first data object;

an act of creating a third data object containing a second identifier used by the party within the federated identity fabric, the second data object also including a role played by the party within the context of the second identifier associated with the second data object;

an act of inserting the second and third data objects into the federated identity fabric;

an act of including, within the second and third data objects, the party identifier to relate the second and third data objects to the first data object such that the party identifier is associated with the first and second identifiers;

an act of receiving a request that includes the first identifier, the request requesting an identifier associated with the party in the context of one of the party's role;

an act of subsequently using the first identifier in the second data object as a template for locating the second data object;

an act of using the party identifier in the second data object to locate the first data object subsequent to using the first identifier to locate the second data object;

an act of retrieving identity related data for the party from the first data object, including identifying that the third data object exists for representing the party and that the third data object represents the party's role identified in the request;

an act of locating the third data object using the party identifier; and an act of retrieving and returning the second identifier contained within the third data object to satisfy the request.

2. The method as recited in claim 1, wherein the act of retrieving identify related information for the entity from the first data object comprises an act of utilizing the first data object to retrieve any combination of:

information generic to any type of party;

information stored using a schema for the particular type of party that has been located;

information about the relationship of the party to any other party of any other type; and information about alternate identifiers related to the same party.

3. The method as recited in claim 2, wherein the type of each of the identifiers corresponds to a taxonomy entry in a taxonomy data structure.

4. The method described in claim 3, wherein individual entries within the taxonomy data structure are the same regardless of which instance of the identity system they are stored in.

5. The method as recited in claim 1, wherein there is, additionally, a single data structure with a single schema capable of representing any relationship between any two entities of any type.

6. The method as recited in claim 5, wherein a specific relationship instance has a type representing the type of the relationship.

7. The method as recited in claim 1, wherein the act of creating a second data object comprises an act of creating the second data object in accordance with the single schema.

8. The method as recited in claim 1, wherein the act of subsequently using the first identifier as a template for locating the second data object comprises an act of using an identity key that includes:
    an identity key type defined in accordance with a identity key taxonomy within the single schema; and
    an identity key value indicating a value for the identity key type, the combination of identity key type and identity key value representing a location in a key identification table.

9. The method as recited in claim 1, wherein the act of creating a first data object within a data structure, the first data object representing a party comprises an act of creating a first data object that represents a party selected from among: organization, person, group, service, and device.

10. The method as recited in claim 1, wherein the party is a person and wherein the role is selected from among: customer, basic citizen, employee, process role, and private person.

11. A computer program product for use in a federated identify fabric, the federated identify fabric including one or more computer systems, each computer system including one or more processors and system memory, the federated identity fabric providing a consistent view of and access to identity information across a plurality of different applications, a plurality of different computer systems, a plurality of different contexts, and a plurality of different networks, the computer program product for implementing a method for retrieving identify related data for a party from the federated identify fabric, the computer program product comprising one or more computer storage media having stored thereon computer-executable instructions that, when executed at a process, cause the federated identity fabric to perform the method including the following:
    receive a request for identity related data for a party, the request including:
        an identity key type defined in accordance with an identity key taxonomy within a single schema, the single schema capable of representing the existence of any entity that can be unambiguously identified;
        an identity key value indicating a value of the identity key type, the combination of identity key type and identity key value representing an entry within key identification table information; and
        a data value request, the data value request representing a request for a portion of party related identity data from a party table entry identifiable through the use of the combination of identity key type and identity key value and a relationship to party identification table information;
    locate the key identification table entry, within the key identification table information, that corresponds to the combination of the identity key type and identity key value;
    access a party identifier value from the key identification table entry, the party identifier value corresponding to the party associated with the identity key;
    refer to a party identity entry in the party identity table information based on the accessed party identifier and the relationship to the party identity table information;
    retrieve party identity data responsive to the data value request from the party identity entry by determining that a second key identification table entry exists which contains the requested party identity data and retrieving the party identity data from the second key identification table; and
    return the party identity data in response to the received request.

12. The computer program product as recited in claim 11, wherein computer-executable instructions that when executed cause the federated identity fabric to retrieve party identity data comprising computer-executable instructions that when executed cause the federated identify fabric to retrieve party identity data for a party selected from among: an organization, a person, a group, a service, and a device.

13. The computer program product as recited in claim 11, wherein computer-executable instructions that when executed cause the federated identity fabric to retrieve party identity data comprising computer-executable instructions that when executed cause the federated identify fabric to retrieve party identity data for a person having a role selected from among: customer, basic citizen, employee, process role, and private person.

14. A computer program product for use in a federated identify fabric, the federated identify fabric including one or more computer systems, each computer system including one or more processors and system memory, providing a consistent view of and access to identity information across a plurality of different applications, a plurality of different computer systems, a plurality of different contexts, and a plurality of different networks, the computer program product for implementing a method for performing a key transformation within the federated identify fabric, the computer program product comprising one or more computer storage media having stored thereon computer-executable instructions that, when executed at a process, cause the federated identity fabric to perform the method including the following:
    an act of creating a first data object within a data structure, the first data object representing a party, the first data object including a party identifier that uniquely identifies the party, the first data object also including a plurality of role types that each identify a role played by the party, each of the role types having an associated role identifier;
    an act of inserting the first data object into the federated identity fabric;
    an act of creating a second data object containing a first identifier used by the party within the federated identity fabric, the second data object also including a role played by the party within the context of the first identifier associated with the first data object;

an act of creating a third data object containing a second identifier used by the party within the federated identity fabric, the second data object also including a role played by the party within the context of the second identifier associated with the second data object;

an act of inserting the second and third data objects into the federated identity fabric;

an act of including, within the second and third data objects, the party identifier to relate the second and third data objects to the first data object such that the party identifier is associated with the first and second identifiers;

an act of receiving a request that includes the first identifier, the request requesting an identifier associated with the party in the context of one of the party's role;

an act of subsequently using the first identifier in the second data object as a template for locating the second data object;

an act of using the party identifier in the second data object to locate the first data object subsequent to using the first identifier to locate the second data object;

an act of retrieving identity related data for the party from the first data object, including identifying that the third data object exists for representing the party and that the third data object represents the party's role identified in the request;

an act of locating the third data object using the party identifier; and an act of retrieving and returning the second identifier contained within the third data object to satisfy the request.

15. The computer program product as recited in claim 14, wherein the party is selected from among: an organization, a person, a group, a service, and a device.

16. The computer program product as recited in claim 14, wherein the party has one or more roles selected from among: customer, basic citizen, employee, process role, and private person.

17. The computer program product as recited in claim 16, wherein the role played by the party within the context of the first identifier is different from the role played by the party within the context of the second identifier.

* * * * *